United States Patent [19]

Lathrop

[11] Patent Number: 4,469,240
[45] Date of Patent: Sep. 4, 1984

[54] HINGED COVER FOR TWO-PART CONTAINER

[75] Inventor: Robert L. Lathrop, San Jose, Calif.

[73] Assignee: Solid State Timer, Ltd., San Ramon, Calif.

[21] Appl. No.: 506,756

[22] Filed: Jun. 22, 1983

[51] Int. Cl.$^3$ .............................................. B65D 43/14
[52] U.S. Cl. ...................................... 220/343; 220/342
[58] Field of Search ............... 220/341, 329, 331, 342, 220/343

[56] References Cited

U.S. PATENT DOCUMENTS

| 2,515,071 | 7/1950 | Battersby | 220/343 |
| 3,295,714 | 1/1967 | DiAddario | 220/343 |
| 4,065,027 | 12/1977 | Ruark et al. | 220/343 |

Primary Examiner—Steven M. Pollard
Attorney, Agent, or Firm—Alan H. MacPherson; Thomas S. MacDonald

[57] ABSTRACT

A hinge cover (20) for a container having a housing top (11) and housing bottom (12), the top housing having two peripheral cut-outs (22) receiving two hinge leaves (21) integrally depending from cover (20). The leaves are insertable inwardly and downwardly at an angle (36) through the cut-outs, and pintles (35) inserted into apertures (23) extending through the leaves. The cover and leaves are then moved upwardly and outwardly at an angle (29) so as to have the pintle ends extend into half-round bearing surfaces (35) extending from the edges of the cut-outs and to a position between side walls (34) of a rectangular depression (37) which confines the pintles laterally. The cover is then closed to extend over a stepped surface (15) of the overall container (10) and the housing bottom (12) containing spaced upstanding post means (44, 45) affixed to the housing top (11). The top (44a) of post means (44, 45) abuts the underside of the pintle positions extending from the leaf aperture so as to confine the pintles and the leaves in a position journalled between the bearing surfaces (35) and the post means top (44a).

9 Claims, 7 Drawing Figures

U.S. Patent  Sep. 4, 1984  4,469,240
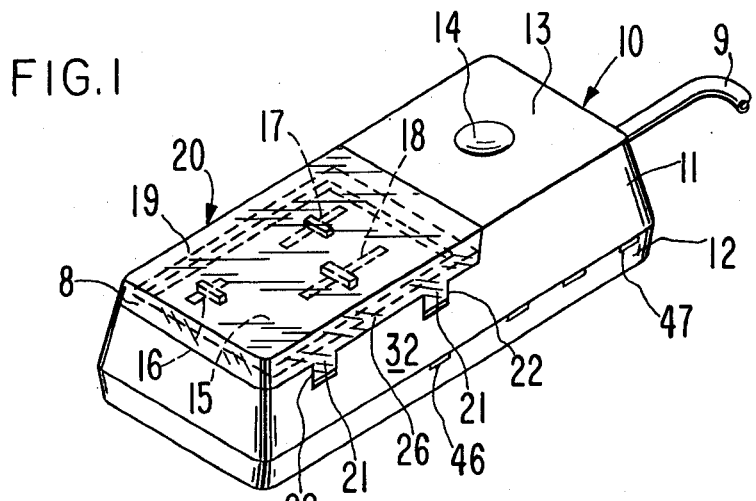
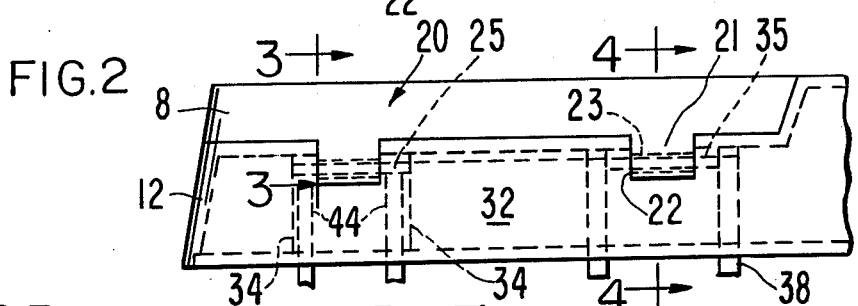
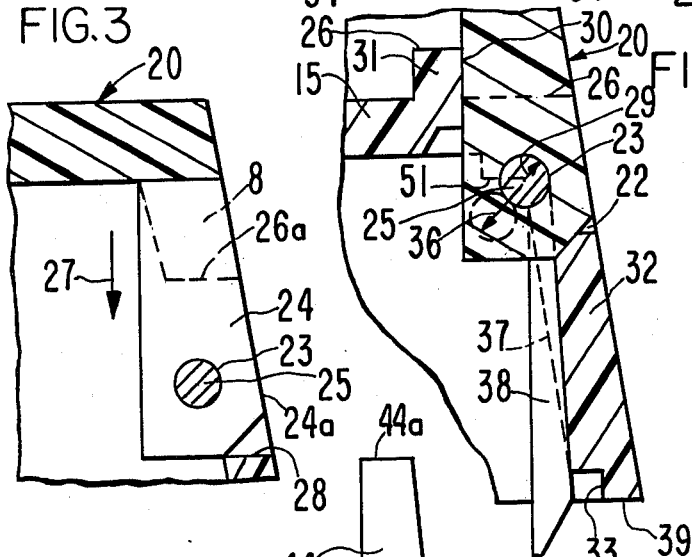
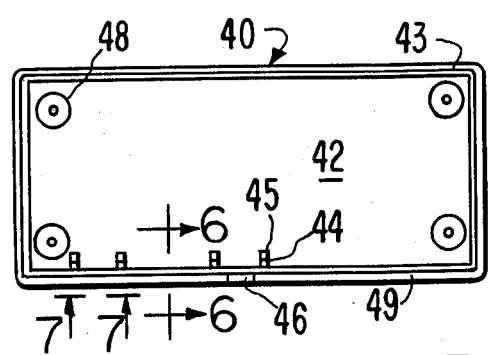
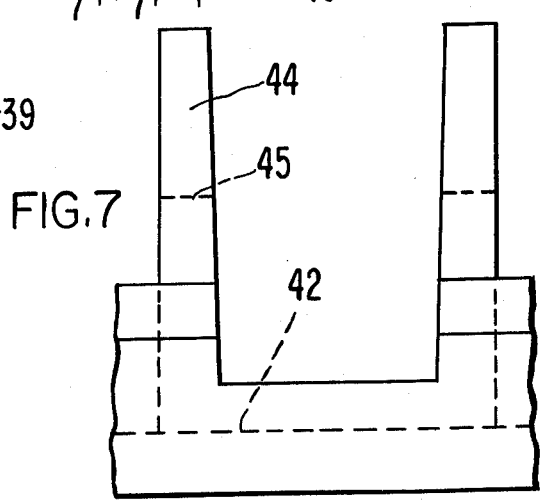
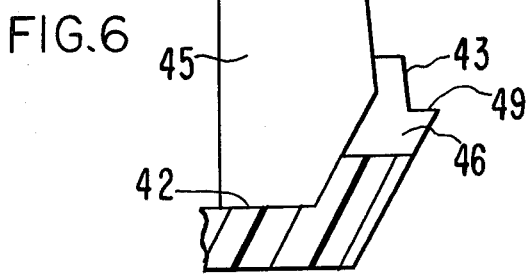

HINGED COVER FOR TWO-PART CONTAINER

BACKGROUND OF THE INVENTION

Field of the Invention

This invention relates to hinged covers for two-part containers wherein in assembly the cover is first inserted in an edge aperture of a first part of the container in one position, pintles inserted, the cover and pintles then seated in a bearing surface of the container part and the other part of the container utilized to fully hold the cover and pintles in the overall container while allow hinged opening and closing movement of the cover. The invention finds particular utility in assembling a protective cover on the top of a lighting control box which is to be placed on a flat surface such as a table or shelf. Means for controlling the lighting fuctions extend from the top surface of the container and are maniputable by the user when the cover is open. The cover in closed position protects the container from ingress of containments and prevents inadvertent movement of the extending controls. The cover is normally transparent or translucent so that indicia can be seen indicating the position of the extending controls.

SUMMARY

The present invention is directed to a two-part container in which the top and bottom halves capture and hold a hinged cover which extends over all or a portion of the top outer surface of the top half of the container. Spaced cut-outs are provided in a rear-top edge of the top half and a cover having internal hinge leaves is insertable into the cut-outs with the cover angularly disposed in an open position with respect to the top half. Pintle pins are then placed in apertures in the hinge leaves and extend laterally from the leaves. The cover, at an intermediate angle between open and closed positions, is then moved slightly outward with respect to the spaced container cut-outs so that the laterally-extending ends of each pintle seat in half-round bearing surfaces contained in the under edges of the top half, continguous to the cut-outs. The pintles are laterally contained in the bearing surfaces. The cover is then movable to a closed position parallel to the container top half upper surface and semi-locked in hinged relation to the container top half. Full locking of the hinged position is provided by providing upstanding posts on the container bottom half which abut an under surface of the laterally-extending pintle ends opposite the half-round bearing surfaces completely confining the pintles. The hinge leaves and the bottom edges of the cut-outs are configured to allow the cover to stay in the "up" position without the user holding it by allowing it to be rotated past the vertical center position.

BRIEF DESCRIPTION OF THE DRAWINGS

FIG. 1 is a rear perspective view of the two-part container and hinged cover.

FIG. 2 is a partial rear view of the cover mounted in the housing top.

FIG. 3 is a cross-sectional view of the cover taken on the line 3—3 of FIG. 2 and magnified to show detail.

FIG. 4 is a cross-sectional view of part of the cover and part of the housing top taken on line 4—4 of FIG. 2 and magnified to show detail.

FIG. 5 is a top view of the housing bottom.

FIG. 6 is a cross-sectional side view taken on the line 6—6 of FIG. 5 showing upstanding post means.

FIG. 7 is a partial rear view of the housing bottom taken from the position 7—7 at the rear side edge of the housing bottom.

DETAILED DESCRIPTION OF DRAWINGS

In FIG. 1 a two-part container is shown which is to be described in terms of a lighting control box 10 having a housing top 11 and a housing bottom 12. Housing top 11 has a top planar surface 13 mounting a photoelectric cell or other means for detecting ambient light. The remainder of the top of housing top 11 comprises a generally planar step-down portion 15 containing a series of control operators 17, slidable in slots 16 and 18 to program the light controller. Normally, at least one of the slots for example, slot 18, has indicia means to indicate the hour-timing cycle of the controller. Since this particular embodiment of a light controller is for placement on a table or other flat surface, the controls 17 must be protected from accidental movement, spillages and dust. Cover 20 is thus provided over the step-down portion 15 so that the planar top 19 of the cover is in the same horizontal plane as surface 13 of housing top 11. Cover 20 is hinged to a rear wall of housing top 11. The structure is easy to assemble, is inexpensive, and has a high degree of structural integrity. Cover 20 is normally made out of transparent or translucent material so that a user may observe the particular position of control operating members 17 within the device while the cover is in the closed position. The cover is openable into a generally vertical position by the user rotating upwardly the forward edge of the cover past the vertical position so that the cover will stay open when the user's hand is removed.

Cover 20 includes a depending wall surface 8 around its periphery, the bottom edge of which seats on exterior portions 26 of stepped surface 15. The cover normally will not have a depending wall on the edge portion 7 which abuts surface 13. Cutout means 22 comprising two rectangular apertures are provided on the rear peripheral edge of surface 15 extending through wall 21 to the interior of the housing top 11. Hinge leaf means 21 comprising two hinge leaves integrally depend from the rear bottom edge of peripheral wall 8 of cover 20 and are sized in width and length to fill the space made by cutout portions 22 while allowing arcuate movement. Each of the leaf means has an aperture 23 extending laterally therethrough into which metal or plastic pintle means are inserted.

Controller 10 also includes a housing bottom 12 which is fastened by suitable screws (not shown) and embossments 48 at the corners to the housing top. The housing bottom includes post means which, when the two parts are assembled, confines the bottom of the extending ends of the pintles, which have been inserted into the apertures in the leaf means. A notch 46 is provided in the housing bottom so as to fascilitate removal of the housing bottom from the housing top. Cooling apertures 47 are provided on the peripheral edge of the housing bottom so as to allow for air flow to cool the electronic components positioned within the lighting controller 10. An electrical conductor 9 exits from one wall of the container to provide power and to operate various lighting circuits.

FIG. 2 shows a rear view of the stepped portion of 15 of housing top 11, showing leaf means 21 insertable within cutout means 22. Pintle means 25 are insertable within apertures 23 in the leaf means 21. Pintles 25 extend from each end of aperture 23 and are laterally confined by side edges 34 of a rectangular depression 37 (FIG. 4) integrally formed in the interior rear sidewall 8 of housing top 11 on either side of the cutouts. The side edges of each depression may be tapered as seen in FIG. 4 and are spaced apart a distance a few hundreds of an inch greater than the length of the pintles. FIG. 2 also illustrates the function of the post means 45 upstanding from the housing bottom which means includes an upstanding end 44 which abuts the bottoms of the extending ends of the pintles 25 on either side of the leaf means 21, so as to prevent the cover when raised from dropping out of the confining walls 34 and having the pintles fall out of apertures 23.

FIG. 3 is a cross-sectional view of the rear edge of cover 20 and its associated integral leaf 21. Leaf 21 comprises a downwardly extending portion 24 laterally containing aperture 23. In closed position, the leaf portion 29 extends with respect to the housing top in the direction noted by arrow 27. It loosely abuts surface 28 at the bottom of the cutout means 22. When the cover is in the open position, the rear edge 24a of leaf portion 24 rests on surface 28. The bottom edge 26a of wall 8 of cover 20 rests on the peripheral outside edge 26 of surface 15 of the housing top.

FIG. 4 is a cross-sectional view taken on line 4—4 of FIG. 2 through the hinge leaf means 21 and hinge pintle means 25. The cover is assembled by inserting the two leaves 21 into apertures 22 in the direction shown by arrow 36 so that the apertures 23 are below and clear of ridge 51 (at approximate the dashed circle position) which extends between the outermost walls of the sets of walls 34 and which forms the inner lower edge of bearing surfaces 35 and also clear of members 37 and 38. Ridge 51 extends also inwardly from the rear wall 32 of the housing top. When the apertures 23 are clear of ridge 51 the pintle pins can be inserted into the apertures. After insertion of the pintle pins 25 into the respective apertures in each of the leaves 21, the cover and integral leaves 24 are moved upwardly and slightly outwardly in the direction shown by arrow 29 with respect to the cutout means so that the extending ends of the pintles seat within half-round bearing surfaces 35 provided at each of the edges of the cutout means 22 in wall 32. The cover is then closed so that surface 30 abuts the outside of a ridge 31 extending around and spaced from the outer edge of surface 15. Surface 30 and ridge 31 resists lateral movement of the cover with respect to the housing top. The cover in this position— closed with respect to the housing top—captures the pintle laterally within the depression 37 formed by the sidewalls 34. Depending wall 32 has a reentrant peripheral portion 33 and a lower edge peripheral surface 39 which interfit with the housing bottom. Spaced guides 38 extends from wall 32 to below surface 39 and functions to guide the rear edge of the housing bottom so that the halves match and the post means are brought into position abutting the pintle ends.

FIG. 5 shows a top view of housing bottom 12 which comprises a rectangular structure 40 having a bottom interior surface 42 over which are mounted electronic packages (not shown) forming the various control functions for the light controller. Structure 40 includes a peripheral edge portion 43 which is adapted to seat in reentrant portion 33 and abut edge portions 39 of the housing top. Upstanding from the bottom surface 42 of the housing bottom are two pairs of post means 45, having upstanding ends 44, which are spaced apart a distance as shown in the left side of FIG. 2 so that the top surfaces of the extending ends 44 abut the underside of pintles 25 on both sides of each the hinge leaf means 21. Post means 44, 45 along with the sidewalls 34 of the sidewall depression 37 function to confine the pintle means while allowing movement of the hinge leaf and pintles when the cover is raised and lowered.

FIG. 6 is a side view of the post means showing the integral attachment of post 45 to surface 42 and the upstanding end 44 which is positionable in assembled position with its top 44a abutting the extending ends of the pintles inserted into leaf apertures 23.

FIG. 7 is a partial rear view of the housing bottom showing the lateral spacing of post means 45 and upstanding arms 44. The upper surface 44a of extending arms 44 confine the extending pintle ends opposite the half-round bearing surfaces 35 and allow for rotative movement of the cover with respect to those bearing surfaces. Due to the length of the hinge means and the location of the pintle means inboard of the ends of each hinge leaf, the cover, when in the open position, is rotatable beyond the midpoint of rotation so that the cover will stay in the up position without the user holding it.

I claim:

1. In a two-part container having a housing bottom and a housing top with peripheral surfaces to form a substantially closed container, said housing top having a top surface; the improvement comprising:
   a cover extending over at least part of said top surface;
   said housing bottom including internal spaced post means;
   means to hinge said cover to said housing top, said hinge means comprising cut-out means adjoining a peripheral edge of said housing top juxtaposed to and spaced from said post means;
   hinge leaf means extending from an edge of said cover for positioning in said cut-out means;
   hinge pintle means extending from said hinge leaf means, and
   bearing surface means in said housing top extending from said cut-out means for receiving said pintle means; said pintle means being insertible into said bearing surface means prior to assembly of said bottom housing onto said top housing and wherein when said top and bottom housings are assembled, said post means abuts said pintle means confining said hinged cover in said assembled housing.

2. The invention of claim 1 wherein said said bearing surface means includes a ridge in said housing top extending between outer ends of said hinge pintle means and wherein said hinge leaf means are inserted below said ridge to allow insertion of said hinge pintle means into said hinge leaf means.

3. The invention of claim 1 in which said cut-out means are spaced apart a distance in excess of the spacing between inner ones of pairs of said post means.

4. The invention of claim 1 including means in said housing top adjacent said cut-out means for laterally confining said pintle means.

5. The invention of claim 4 in which said confining means comprises a depression in an inner depending surface of said housing top and spaced from lateral edges of said cut-out means.

6. The invention of claim 4 wherein said hinge leaf means is of sufficient length so as to be inserted through said cut-out means to a position clear of said means for confining said pintle means to allow said pintle means to be inserted into an aperture in said leaf means.

7. The invention of claim 1 wherein said post means includes an upstandingly extending top end which upon assembly of said housing top and housing bottom abuts a bottom surface of said pintle means adjacent said cut-out means confining said pintle means in said bearing surface means.

8. The invention of claim 1 including a pair of cut-out means spaced from each other adjoining said peripheral edge, a pair of hinge leaf means positioned in said pair of cut-out means, and pairs of post means positioned exteriorly of each of said cut-out means to confine said pintle means.

9. The invention of claim 1 wherein said hinge leaf means is of sufficient length so as to be insertable through said cut-out means to a position below said bearing surface means to allow insertion of said pintle means into an aperture extending through said hinge leaf means.

* * * * *